United States Patent [19]

Elliott et al.

[11] Patent Number: 5,449,463
[45] Date of Patent: Sep. 12, 1995

[54] DESALTER WASH WATER ADDITIVE

[75] Inventors: Phillip L. Elliott, Houston; Michael L. Braden, Sugar Land; Donald J. Newman, Richmond, all of Tex.

[73] Assignee: Nalco Chemical Company, Naperville, Ill.

[21] Appl. No.: 212,455

[22] Filed: Mar. 11, 1994

[51] Int. Cl.$^6$ .............................. B01D 17/05
[52] U.S. Cl. .................. 210/708; 208/188; 208/251 R; 210/728; 210/734; 252/341; 252/358
[58] Field of Search ............ 210/708, 709, 725, 727, 210/728, 734; 252/341, 358; 208/180, 188, 251 R

[56] References Cited

U.S. PATENT DOCUMENTS

| | | | |
|---|---|---|---|
| 4,929,655 | 5/1990 | Takeda et al. | 524/458 |
| 4,947,885 | 8/1990 | Hart | 210/709 |
| 5,006,590 | 4/1991 | Takeda et al. | 524/458 |
| 5,176,847 | 1/1993 | Kremer | 210/708 |
| 5,236,591 | 8/1993 | Hart | 210/708 |
| 5,256,305 | 10/1993 | Hart | 210/708 |
| 5,294,347 | 3/1994 | Byrne et al. | 210/708 |
| 5,330,650 | 7/1994 | Byrne et al. | 210/708 |
| 5,332,506 | 7/1994 | Marble et al. | 210/708 |
| 5,332,507 | 7/1994 | Braden et al. | 210/708 |

*Primary Examiner*—Peter A. Hruskoci
*Attorney, Agent, or Firm*—Robert A. Miller; Patricia A. Charlier; James J. Drake

[57] ABSTRACT

One aspect of the invention provides a method of preventing crude oil from becoming emulsified in desalter wash water. According to the method, the wash water is treated with an effective amount of a dispersion of a water-soluble cationic polymer.

7 Claims, No Drawings

DESALTER WASH WATER ADDITIVE

BACKGROUND OF THE INVENTION

1. Field of the Invention

The present invention relates to the prevention of oil emulsification/dispersion in desalter brine water via the use of a water soluble polymer dispersed in a concentrated salt media.

2. Description of the Prior Art

In an oil refinery, the desalting process is a water extraction of crude oil in order to remove water soluble and water dispersible impurities. Crude oil is heated to a temperature of 230–300 degrees Fahrenheit. In more detail, water containing low levels of impurities is injected into the crude oil. Next, this stream of oil and water is subjected to high shear in order to thoroughly mix the wash water into the crude oil, thereby diluting the impurities. This shearing action produces a relatively stable water-in-oil emulsion. The emulsion enters a desalting vessel where the emulsion is resolved with the assistance of residence time and an electric field. Ideally, the process results in crude oil that is relatively free of water soluble impurities and a brine stream that is free of oil.

However, in most cases, chemicals are required to speed the resolution of the emulsion in order to provide oil that is relatively free of water and water that is free of oil. Such chemicals are known as emulsion breakers or demulsifiers. In some situations, refiners choose to process more crude oil than their equipment is designed to accommodate. Occasionally, the emulsion breaker cannot overcome these equipment limitations. The result is a brine stream that contains 05.–2.0 volume % dispersed oil. Often, extremely high dosages of the emulsion breaker are required to alleviate this situation.

Latex polymers suffer from problems but are used quite frequently. Latex polymer preparations include 30–35% solids dispersed in oil. The latex polymer must be also inverted prior to use. The equipment in the oil refinery for prior inversion is not always available, thus forcing the direct feeding of the polymer into the system. Numerous problems associated with this feeding method have caused many customers to avoid latex polymers. In addition, the latexes generally have a very narrow treating range, often resulting in overtreatment at higher dosages.

The oil in these systems consists of crude oil. The amount of oil in this application can range from several hundred to tens of thousands parts per million. The prevention of oil emulsions or dispersions in the desalter brine water inhibits oil loss and provides cleaner water sent to the wastewater treatment plant. The avoidance of oil being received at the wastewater treatment plant can be very critical to the established discharge limits for total dissolved solids (TSS), carbon oxygen demand (COD), biological oxygen demand (BOD) and total organic carbon (TOC) into local sewers and rivers. Not only has the EPA established severe limits on the oil and grease discharge, these industries are affected by local city ordinances as well.

SUMMARY OF THE INVENTION

One aspect of the invention provides a method for preventing crude oil from becoming emulsified in the wash water of a desalter. According to the method, the desalter wash water is treated with an effective amount of a dispersion of a water-soluble cationic polymer. The dispersion of the water-soluble cationic polymer is prepared by polymerizing a water-soluble monomer mixture containing at least 5 mole % of a cationic monomer represented by general formula (I) and at least 5 mole % of acrylamide or methacrylamide in an aqueous solution of a polyvalent anionic salt. The polymerization is carried out in the presence of a dispersant polymer. The dispersant polymer is a water-soluble cationic polymer which is soluble in the aqueous solution of the polyvalent anionic salt. Also, the dispersant polymer contains at least 20 mole % of cationic monomer units represented by general formula (II):

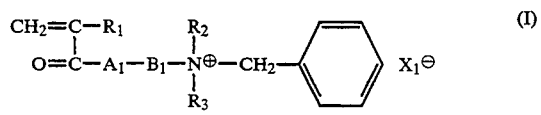

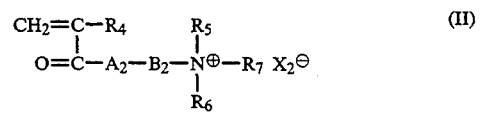

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1$— and $X_2$— are each a counter anion.

A further aspect of the invention provides that the polymerization is further carried out in the presence of a seed polymer. The seed polymer is a water-soluble cationic polymer which is insoluble in the aqueous solution of the polyvalent anionic salt. The seed polymer also contains at least 5 mole % of cationic monomer units represented by the general formula (I).

According to one preferred embodiment, the water-soluble monomer mixture further contains at least 5 mole % of a cationic monomer represented by the general formula (II). The polyvalent anionic salt preferably comprises a phosphate, a sulfate or a mixture thereof.

DESCRIPTION OF THE PREFERRED EMBODIMENTS

According to the invention, the aforementioned water soluble polymer is added to the desalter wash water in an amount effective to prevent emulsification or dispersion of crude oil droplets in the wash water.

The invention provides several benefits compared to the prior art:

1) the prevention of oil emulsions and dispersions in desalter brine waters;
2) the reduction in the amount of crude oil flowing to the wastewater treatment plant;
3) the invention does not produce a floc in the oil layer as in the cases of oil external latex polymers;
4) with the invention, a rag layer (an emulsion at the oil/water interface) is not present or is kept at a minimum;
5) dosages of the polymer of the invention are lower than the prior art and range from about 0.5 ppm to about 25 ppm; and
6) the invention allows a reduction in the emulsion breaker dosage.

The dispersion polymerization used in the invention method offer numerous advantages which have previously been unavailable. Since the polymers of the invention are synthesized entirely in water, no oil solvent is required. This is significant since:

1) the polymers of the invention do not present a fire hazard;
2) oil is not added to the water which is to be treated (more environmental friendly);
3) dissolution of the polymers of the invention requires only the addition of water—no special activators are needed;
4) the ability of the polymers of the invention to dissolve/invert is superior to that of oil dispersion latexes; and
5) the polymers of the invention may be diluted to virtually any concentration by using appropriately concentrated salt water.

Another major advantage is that the bulk viscosity of the polymer is low, unlike some oil dispersion latex polymers. This physical property enables any standard chemical pump to deliver the material at the injection site.

In more detail, the invention provides a superior method for preventing crude oil from emulsifying or dispersing in desalter wash water. A new class of water-soluble dispersion polymers have been discovered to be more effective in preventing emulsified oil in desalter waters than currently available chemical treatments. As will be discussed in more detail below, the polymer dispersion of the invention is prepared in an aqueous solution of a polyvalent anionic salt. The polymer dispersion of the invention achieves fine particle sizes and aqueous solubilities not available with other polymers used for this application. The polymer dispersion used in the present invention is shown in the Examples to remove twice as much emulsified oil from produced waste water as currently available chemical treatments. Furthermore, there does not appear to be a problem with overfeeding the polymer dispersion which is a drawback with latex polymers.

According to the method, the polymers of the invention are added to desalter wash water. The polymers are added in an effective amount of from 0.5 to about 100 ppm. More preferably, the amount of the polymer added is from 2 to about 40 ppm; and most preferably from about 4 to about 25 ppm. It is believed, that there does not appear to be a maximum dosage at which the polymers adversely affect the system. At some higher doses the beneficial affect may plateau, and on a cost basis such higher doses, probably above about 100 ppm, are not cost effective. The polymers of the invention are preferably added to the system in neat form. However, in some applications, the polymers can be added as an aqueous solution.

Once the polymers of the invention are added to the desalter wash water, the treated wash water is naturally agitated as it moves through the desalter. The polymers of the invention will cause the emulsified oil to separate from the water. The treated water can now be discharged to a waste treatment facility or reused as desalter wash water. The preferred polymers of the invention are manufactured by Hymo Corporation, Japan. Preferred polymer preparations are available from Hymo Corporation under the trade name designations DR-2570, DR-3000 and DR-4000. Methods for manufacturing the polymer dispersion used in the invention is described in detail in U.S. Pat. Nos. 5,006,590 and 4,929,655, assigned to Kyoritsu Yuki Co., Ltd., Tokyo, Japan. The disclosures of these two patents are incorporated herein.

According to the invention, the polymer dispersion used to treat the wash water is prepared from a water-soluble monomer mixture containing at least 5 mole % of a cationic monomer represented by the general formula (I):

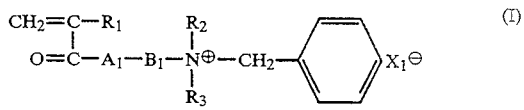

wherein $R_1$ is H or $CH_3$; $R_2$ and $R_3$ are each an alkyl group having 1 to 2 carbon atoms; $A_1$ is an oxygen atom or NH; $B_1$ is an alkyl group having 2 to 4 carbon atoms or a hydroxypropyl group and $X_1$ is a counter anion. The above water-soluble monomer mixture is soluble in the aqueous solution of the polyvalent anionic salt. The polymer generated from the monomer mixture is, however, insoluble in the aqueous polyvalent anionic salt solution. The polymer of the monomer mixture can also be used as the seed polymer. The seed polymer is described in detail below.

The above cationic monomer represented by the general formula (I) preferably is a quaternary ammonium salt obtained by the reaction of benzyl chloride and dimethylaminoethyl acrylate, diethylaminoethyl acrylate, dimethylaminohydroxypropyl acrylate, dimethylaminopropyl acrylamide, dimethylaminoethyl methacrylate, dimethylaminoethyl methacrylate, diethylaminoethyl methacrylate and dimethylaminopropyl methacrylamide.

Monomers preferably copolymerized with the cationic monomer represented by the general formula (I) includes acrylamide, methacrylamide and the cationic monomers represented by the general formula (II):

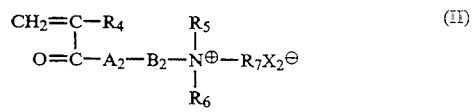

wherein $R_4$ is H or $CH_3$; $R_5$ and $R_6$ are each an alkyl group having 1 to 2 carbon atoms; $R_7$ is H or an alkyl group having 1 to 2 carbon atoms; $A_2$ is an oxygen atom or NH; $B_2$ is an alkyl group having 2 to 4 carbon atoms or a hydroxypropyl group and $X_2$ is a counter anion.

Preferable monomers represented by the formula (II) include the ammonium salts of dimethylaminoethyl acrylate, diethylaminoethyl acrylate, dimethylaminopropyl acrylamide, diethylaminopropyl acrylamide and dimethylhydroxypropyl acrylate, dimethylaminoethyl methacrylate, diethylaminoethyl methacrylate, dimethylaminopropyl methacrylamide, diethylaminopropyl methacrylamide and dimethylhydroxypropyl methacrylate as well as the methylated and ethylated quaternary salts. Among the more preferable cationic monomers represented by the general formula (II) are the salts and methylated quaternary salts of dialkylaminoethyl acrylate and dialkylaminoethyl methacrylate. The concentration of the above-mentioned monomers in the polymerization reaction mixture is suitably in the range of 5 to 30% by weight.

The polyvalent anionic salt to be incorporated in the aqueous solution according to the present invention is suitably a sulfate, a phosphate or a mixture thereof.

Preferable salts include ammonium sulfate, sodium sulfate, magnesium sulfate, aluminum sulfate, ammonium hydrogenphosphate, sodium hydrogenphosphate and potassium hydrogenphosphate. In the present invention, these salts may be each used as an aqueous solution thereof having a concentration of 15% or above.

A dispersant polymer is present in the aqueous anionic salt solution in which the polymerization of the above monomers occurs. The dispersant polymer is a water-soluble high molecular weight cationic polymer. The dispersant polymer is soluble in the above-mentioned aqueous salt solution. The dispersant polymer is preferably used in an amount of from 1 to 10% by weight based on the total weight of the monomers. The dispersant polymer is composed of 20 mole % or more of cationic monomer units represented by the formula (II). Preferably the residual mole % is acrylamide or methacrylamide. The performance of the dispersant is not greatly affected by molecular weight. However, the molecular weight of the dispersant is preferably in the range of 10,000 to 10,000,000. According to one embodiment of the invention a multifunctional alcohol such as glycerin or polyethylene glycol is coexistent in the polymerization system. The deposition of the fine particles is smoothly carried out in the presence of these alcohols.

For the polymerizations a usual water-soluble radical-forming agent can be employed, but preferably water-soluble azo compounds such as 2,2'-azobis(2-amidinopropane) hydrochloride and 2,2'-azobis(N,N'-dimethyleneisobutylamine) hydrochloride are used.

According to one embodiment of the invention, a seed polymer is added before the beginning of the polymerization of the above monomers for the purpose of obtaining a fine dispersion. The seed polymer is a water-soluble cationic polymer insoluble in the aqueous solution of the polyvalent anionic salt. The seed polymer is preferably a polymer prepared from the above monomer mixture by the process described herein. Nevertheless, the monomer composition of the seed polymer need not always be equal to that of the water-soluble cationic polymer formed during polymerization. However, like the water-soluble polymer formed during polymerization, the seed polymer should contain at least 5 mole percent of cationic monomer units represented by the general formula (I). According to one embodiment of the invention, the seed polymer used in one polymerization reaction is the water-soluble polymer prepared in a previous reaction which used the same monomer mixture.

The following Examples are presented to describe preferred embodiments and utilities of the invention and are not meant to limit the invention unless otherwise stated in the claims appended hereto.

Example 1

An evaluation of the invention was conducted on a pilot desalting unit. This unit allows simulation of field desalting conditions. Initially, tests were conducted with crude oil treated with 12 parts per million (ppm) of a conventional alkylphenol alkoxylate emulsion breaker. When the crude oil, wash water mixture was subjected to high shear rate in the unit, brine collected from the run contained an average of about 20,000 ppm emulsified/dispersed crude oil.

Next, the same crude oil was treated with the same emulsion breaker at 12 ppm and processed in the unit at the same conditions. And the wash water was treated with 5 ppm of one water soluble polymer of the invention, DR 3000 obtained from the Hymo Corporation, Japan. The brine collected during this run contained less than about 1,000 ppm of crude oil.

Changes can be made in the composition, operation and arrangement of the method of the present invention described herein without departing from the concept and scope of the invention as defined in the following claims.

We claim:

1. A method of preventing crude oil from becoming emulsified or dispersed in desalter wash water, the method comprising:

A. treating the desalter wash water prior to the wash water being added to a desalter with an effective amount of a dispersion of a water-soluble cationic polymer, said dispersion of the water-soluble cationic polymer being prepared by polymerizing a water-soluble monomer mixture containing at least 5 mole % of a cationic monomer represented by general formula (I) and at least 5 mole % of acrylamide or methacrylamide in an aqueous solution of a polyvalent anionic salt, said polymerization is carried out in the presence of a dispersant polymer, said dispersant polymer being a water-soluble cationic polymer which is soluble in said aqueous solution of the polyvalent anionic salt and which contains at least 20 mole % of cationic monomer units represented by a general formula (II):

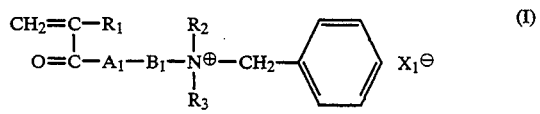

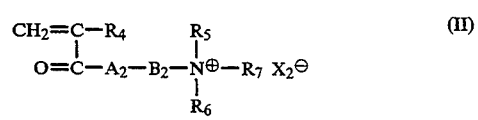

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1$— and $X_2$— are each a counter anion;

B. mixing crude oil with the treated desalter wash water containing said cationic polymer under high shear conditions to form a water-in-oil emulsion;

C. subjecting the water-in-oil emulsion to a desalting process to resolve said emulsion; and then, D. separating the crude oil from the water-in-oil emulsion to obtain crude oil and a desalter wash water substantially free of oil.

2. The method of claim 1 wherein said polymerization is further carried out in the presence of a seed polymer; said seed polymer being a water-soluble cationic polymer which is insoluble in said aqueous solution of the polyvalent anionic salt and which contains at least 5 mole % of cationic monomer units represented by the general formula (I).

3. The method of claim 1 wherein the water-soluble monomer mixture further contains at least 5 mole % of a cationic monomer represented by the general formula (II).

4. The method of claim 1 wherein the polyvalent anionic salt comprises a phosphate, a sulfate or a mixture thereof.

5. The method of claim 1 wherein the effective amount of the dispersion of the water-soluble cationic polymer added to the wash water is at least 0.5 ppm.

6. The method of claim 1 wherein the effective amount of the dispersion of the water-soluble cationic polymer added to the wash water is at least 2 ppm.

7. The method of claim 1 wherein the effective amount of the dispersion of the water-soluble cationic polymer added to the wash water is at least 4 ppm.

* * * * *